United States Patent [19]

Klaus

[11] 4,106,977
[45] Aug. 15, 1978

[54] PROCESS FOR PRODUCTION OF OIL CONTROL RINGS

[75] Inventor: Heck Klaus, Ingolstadt, Fed. Rep. of Germany

[73] Assignee: Audi Nsu Auto Union Aktiengesellschaft, Fed. Rep. of Germany

[21] Appl. No.: 679,890

[22] Filed: Apr. 26, 1976

[30] Foreign Application Priority Data

May 9, 1975 [DE] Fed. Rep. of Germany ....... 2520698

[51] Int. Cl.² .............................................. C23F 1/02
[52] U.S. Cl. ............................. 156/645; 123/198 R; 156/154; 156/656; 156/665
[58] Field of Search ..................... 156/3, 6, 7, 18, 154, 156/630, 632, 634, 645, 656, 665; 29/191, 191.2, 191.4; 427/34, 287; 92/223; 204/129.1, 129.35, 129.46, 129.55; 123/1, 198 R, 198 DA; 308/237, DIG. 11

[56] References Cited

U.S. PATENT DOCUMENTS

| | | | |
|---|---|---|---|
| 2,887,766 | 5/1959 | Fike et al. | 29/183.5 |
| 3,333,579 | 8/1967 | Shockley et al. | 156/645 X |
| 3,375,181 | 3/1968 | Koech | 156/6 X |
| 3,634,160 | 1/1972 | Van Esdonk | 156/3 |
| 3,945,893 | 3/1976 | Ishimori et al. | 204/129.1 |
| 3,976,809 | 8/1976 | Dowell | 427/34 |

*Primary Examiner*—William A. Powell
*Attorney, Agent, or Firm*—Kane, Dalsimer, Kane, Sullivan and Kurucz

[57] ABSTRACT

A process for the production of oil control rings having a scraper edge formed by a layer consisting of a wear-resistant material. The wear-resistant layer is embedded between two softer layers. Thereafter, the scraper edge is machined and the soft layers recessed by etching to expose the scraper edges.

6 Claims, 4 Drawing Figures

PROCESS FOR PRODUCTION OF OIL CONTROL RINGS

BACKGROUND OF THE INVENTION

Oil control rings are used on reciprocating or rotary pistons of internal combustion engines to prevent oil from leaking into the working or combustion chambers. Oil control rings intended for reciprocating pistons cooperate on their outer periphery with the cylinder lining. To prevent the rings from floating upon the film of oil formed on the cylinder lining and to improve scraping action, the shape of the outer periphery is not may cylindrical but into a configuration of a truncated cone, the base of greater diameter forming the scraper edge. Oil control rings for rotary pistons on the other hand cooperate with the adjacent end wall on one face which face is inclined radially outwardly; and in this manner it forms a sharp scraper edge on the inner periphery thereof and prevents the ring from floating upon the film of oil on the end wall. In both cases, the scraper edge is required to remain sharp over as long a period of service as possible, since once the edge has been rounded by wear the scraping action is considerably impaired. Accordingly, it is known that the scraper edge may be formed of a thin layer of a wear-resistant material, for example chromium, to be applied to the bottom face of rings for reciprocating pistons and to the inner periphery of the ring for rotary pistons. While these known oil control rings function satisfactorily in operation, they present rather troublesome problems during fabrication. Thus, after application of the wear-resistant layer, the rings must be ground to form the finished scraper edge, and owing to brittleness of the wear-resistant layer, the continuity of the scraper edge may easily be breached. A comparatively high scrap rate results.

SUMMARY OF THE INVENTION

The object of the invention is to provide a process for making oil control rings of the kind above mentioned, wherein any breach in the scraper edge during production is reliably avoided.

This object is accomplished according to the invention, by embedding the wear-resistant layer between two softer layers then, the surface of this composite structure that will contain the future scraper edge is finished by machining, and, finally, the softer layers are recessed from the wear-resistant layer by etching to expose the scraper edge on either side.

During machining which could be a simple grinding operation the wear-resistant layer is supported on either side by the softer layers, so that damage to the edge of the wear-resistant layer is minimized not eliminated. The process of this invention makes it possible to employ wear-resistant layers in thicknesses of 0.05 to 0.3 mm, for example. Accordingly, these layers are intrinsically of the size of a scraper edge and, therefore, cannot be blunted by wear. When the softer neighboring layers are removed the edge of the wear-resistant layer will be exposed. This may be done by the chemical process of etching, for example, with caustic soda or phosphoric acid, or by an electrochemical process. In the production of oil control rings, it is now possible for the first time to employ wear-resistant hard alloys such as tungsten carbide, aluminum oxide, titanium carbide, chromium carbide, chromium oxide, etc. in the aforementioned layer thickness of 0.05 to 0.3 mm.

The layers are preferably applied by plasma spraying, as an especially good bond can thus be achieved. However, other coating processes, in partcular, galvanic processes, may be used.

The softer layers between which the wear-resistant layer is sandwiched consist preferably of aluminum or aluminum alloys. Alternatively, however, other materials, for example copper, may be used instead.

Preferably, the three layers, namely the two softer layers and the wear-resistant layer between them are applied in succession to a base member, such as cast iron. It is even possible for one of the softer layers to be itself the base member.

The process according to the invention will now be illustrated in more detail with reference to the drawings.

DETAILED DESCRIPTION

Figure 1:
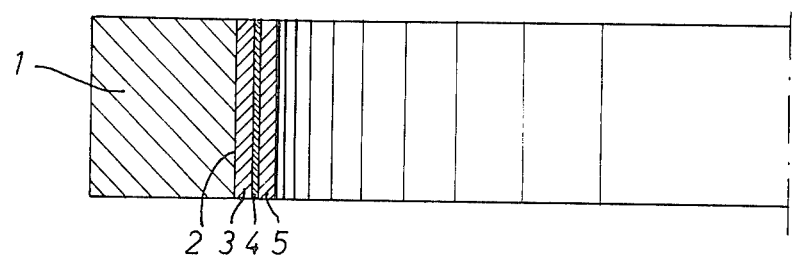
FIG. 1 shows a partial axial sectional view of an oil control ring for rotary pistons after the three layers have been applied to the inner periphery of an annular base member.

The oil control ring shown in FIG. 1 consists of an annular base member 1, preferably of cast iron. On the inner periphery 2 of the base member a soft layer 3, a hard wear-resistant layer 4 and another soft layer 5. These layers are preferably by plasma spraying. The soft layers 3 and 5 may by way of example be aluminum or an alloy of aluminum. The wear-resistant layer 4 consists preferably of a hard alloy, such as tungsten carbide, aluminum oxide, titanium carbide, chromium carbide or chromium oxide. In order to form a hard scraper edge the thickness of the wear-resistant layer 4 is critical and should be preferably on the order of 0.05 to 0.3 mm.

Figure 2:
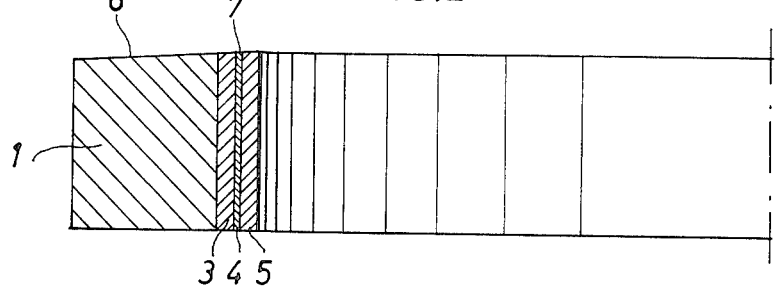
FIG. 2 shows a similar view after one face has been ground to a truncated cone to form the scraper edge.

After application of the layers 3, 4, and 5, the face 6 of the base member is machined or ground to a truncated cone as shown in FIG. 2. This grinding operation may advantageously be the final machining of the future scraper edge that is to be formed by the face 7 of the wear-resistant layer 4. Inasmuch as the wear-resistant layer 4 is supported on either side by layers 3 and 5, the machining of the face 6 will not occasion any erosion or breaking off of portions of the face 7 of the wear-resistant layer 4, even if the wear-resistant layer 4 is extremely thin.

Figure 3:
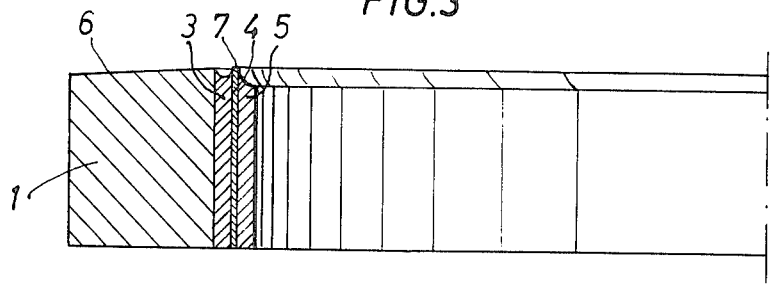
FIG. 3 shows a similar view of the finished ring after the softer layers next to the wear-resistant layer has been partially removed.

After the above-mentioned maching of the face 6, the soft layers 3 and 5 are etched or otherwise removed on face 6 on either side of the wear-resistant layer 4. In this manner, the wear-resistant layer 4 is exposed on either side of the face 7 forming the wear-resistant layer 4 as may be seen in FIG. 3. The etching may be done by a chemical process, for example using caustic sode or phosphoric acid or by an known electrochemical process. The oil control ring is shown in its finished state in FIG. 3.

Figure 4:
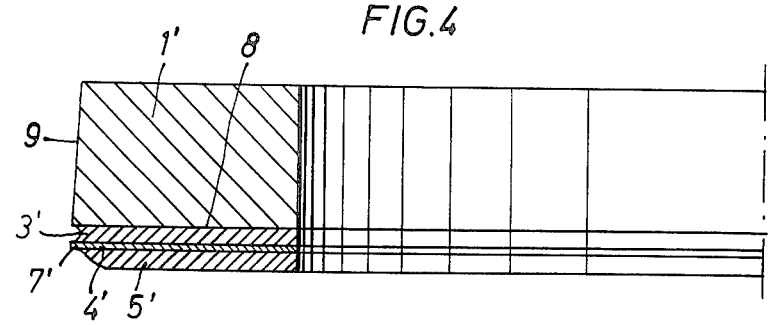
FIG. 4 shows a partial axial sectional view of a finished oil control ring for reciprocating pistons produced by the process according to the invention.

FIG. 4 shows a finished oil control ring for reciprocating pistons. The steps performed for producing this ring are the same as previously described in connection with FIGS. 1 to 3. In order to accommodate the different location of the seal, the three layers 3' 4' and 5' are applied to one face 8 of the annular base member 1'. The machining takes place on the outer periphery 9 of the base member 1', thereby finishing the scraper edge 7' formed by the outer periphery of the wear-resistant layer 4'. As in the previous example, the soft layers 3' and 5' are then etched back on the outer periphery 9 to either side of the wear-resistant layer 4' to expose the scraper edge 7'.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A process for production of oil control rings for pistons of internal combustion engines having a smooth and continuous scraper edge formed by a layer of a wear-resistant material, a pair of spaced softer layers, interposing and embedding the wear-resistant layer between the softer layers, then finishing a surface to form a smooth and continuous exposed scraper edge, and then recessing the soft layers on said surface to either side of the wear resistant layer so that the scraper edge will cooperate with associated surfaces of the engine in preventing oil from escaping across the scraper edge.

2. The process according to claim 1 wherein the layers are applied by plasma spraying.

3. The process according to claim 1 wherein the softer layers are selected from the group consisting of aluminum and an aluminum alloy.

4. The process according to claim 1 wherein the wear-resistant layer is of hard substances selected from the group consisting of tungsten carbide, aluminum oxide, titanium carbide, chromium carbide and chromium oxide.

5. The process according to claim 1 wherein the finishing of the surface is accomplished by machining it.

6. The process according to claim 1 wherein the recessing of the soft layers is accomplished by an etching operation.

* * * * *